(12) United States Patent
Berry

(10) Patent No.: US 8,746,789 B2
(45) Date of Patent: Jun. 10, 2014

(54) PROTECTIVE COVER FOR BABY CARRIER

(76) Inventor: Catherine A. Berry, Gretna, LA (US)

( * ) Notice: Subject to any disclaimer, the term of this patent is extended or adjusted under 35 U.S.C. 154(b) by 64 days.

(21) Appl. No.: 13/442,820

(22) Filed: Apr. 9, 2012

(65) Prior Publication Data

US 2012/0256452 A1      Oct. 11, 2012

Related U.S. Application Data

(63) Continuation-in-part of application No. 12/603,136, filed on Oct. 21, 2009, now abandoned.

(60) Provisional application No. 61/110,821, filed on Nov. 3, 2008.

(51) Int. Cl.
*A47C 7/66*        (2006.01)
*A47C 7/74*        (2006.01)

(52) U.S. Cl.
USPC .................................................. 297/184.13

(58) Field of Classification Search
USPC .................................................. 297/184.13
See application file for complete search history.

(56) References Cited

U.S. PATENT DOCUMENTS

| | | | |
|---|---|---|---|
| 4,946,221 A | 8/1990 | Livingston | 297/184.13 |
| 5,074,616 A | 12/1991 | Smith | 297/184.13 |
| 5,522,639 A | 6/1996 | Jaime | 297/184.13 |
| 5,730,490 A | 3/1998 | Mortenson | 297/184.13 |
| 6,039,393 A | 3/2000 | Roh | 97/184.13 |
| 6,481,791 B1 | 11/2002 | Facchini et al. | 297/184.13 |
| 7,284,790 B1 | 10/2007 | Brewer | 297/184.13 |
| 2003/0193221 A1 | 10/2003 | Hoey/Slocombe et al. | 297/184.13 |

*Primary Examiner* — Rodney B White
(74) *Attorney, Agent, or Firm* — L.C. Begin & Associates, PLLC.

(57) ABSTRACT

A protective cover for covering a portion of a baby carrier in which a baby is to be received. The cover includes a canopy structured to enclose the baby-receiving portion of the carrier when secured to the baby carrier, and a first cutout portion formed along the canopy in a position enabling access to a handle of the baby carrier through the first cutout portion when the cover is positioned over the baby-receiving portion of the carrier. A handle cover flap is attached to the canopy and structured so as to be positionable to close the first cutout portion.

12 Claims, 7 Drawing Sheets

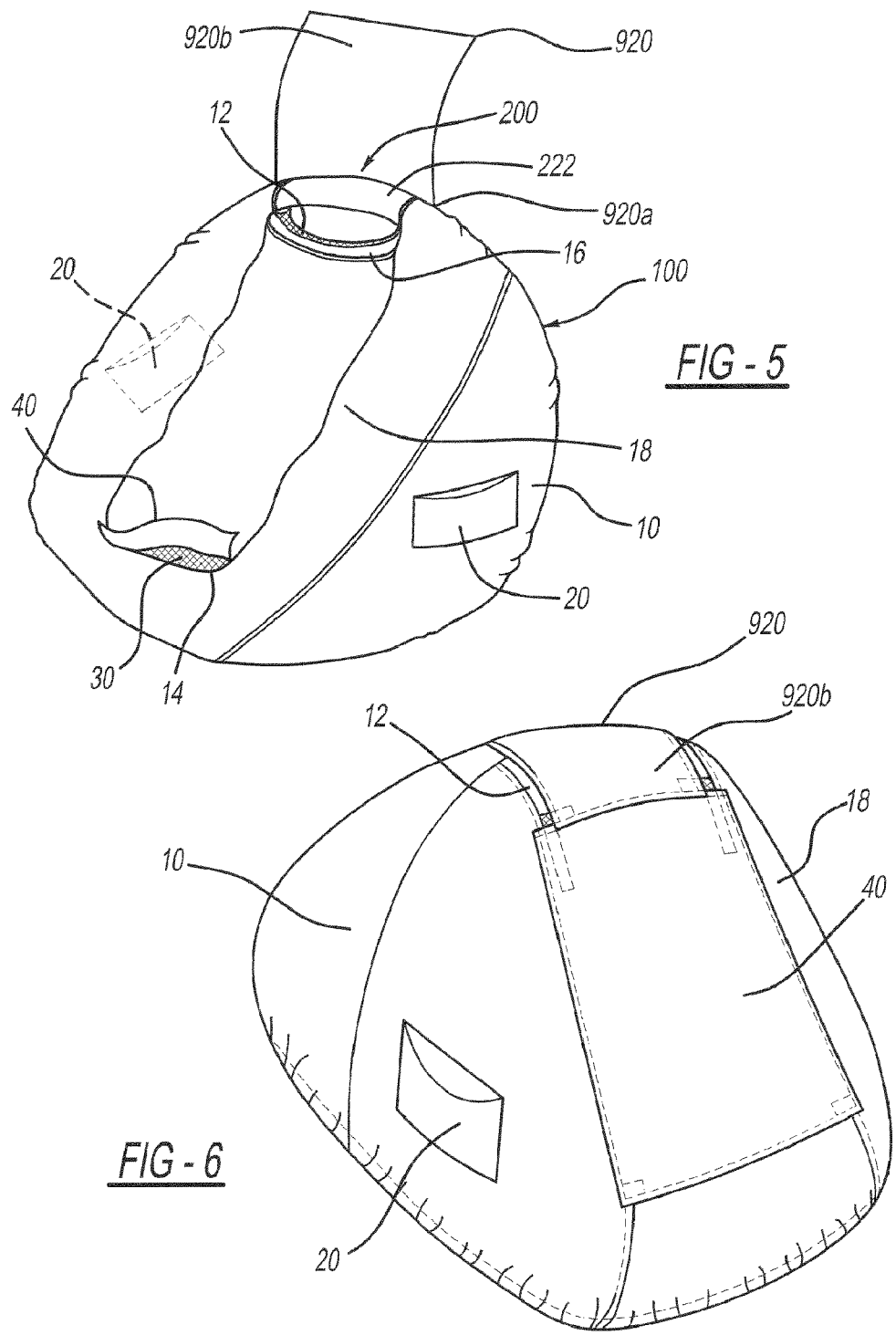

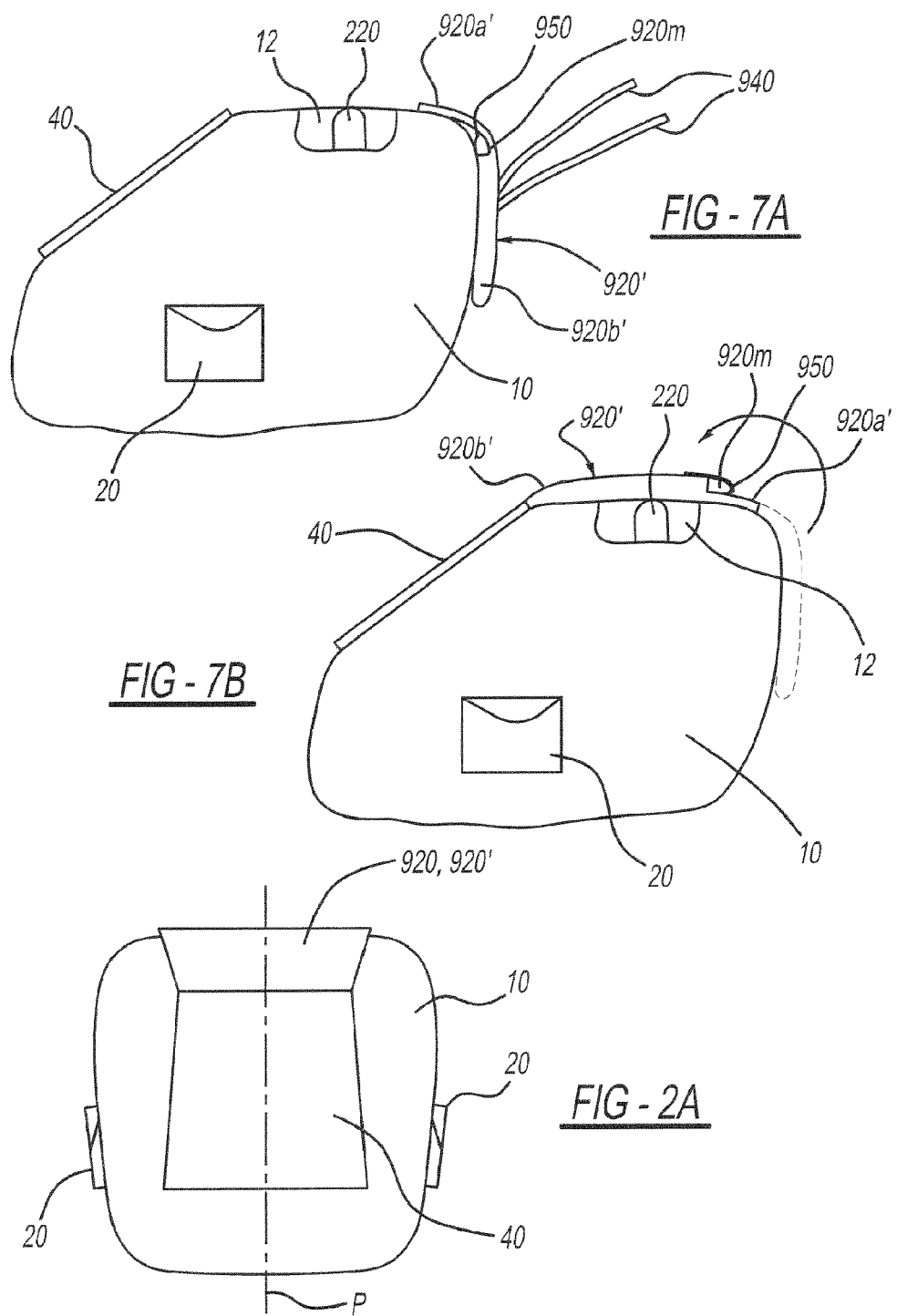

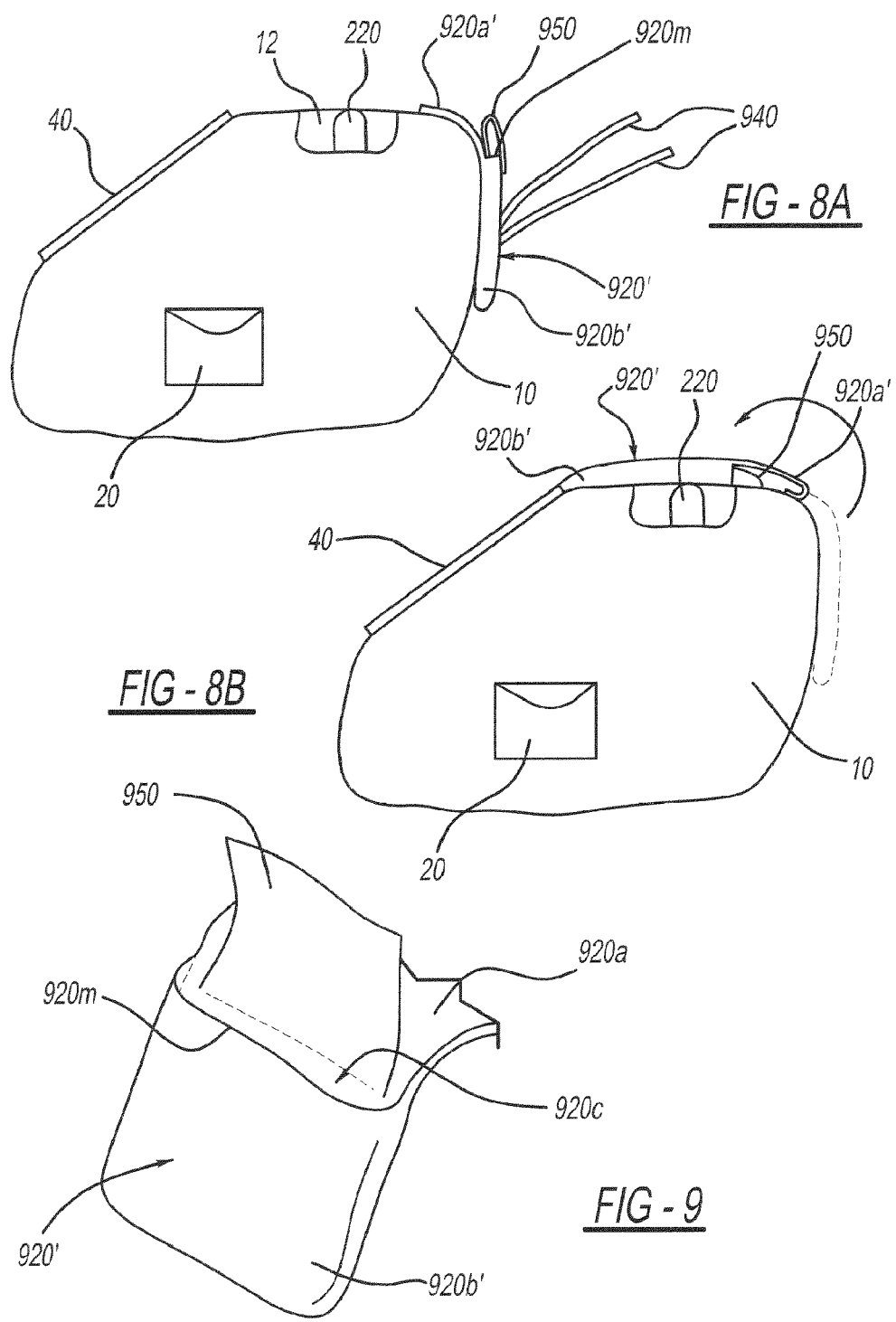

PROTECTIVE COVER FOR BABY CARRIER

CROSS-REFERENCE TO RELATED APPLICATIONS

This application is a continuation-in-part of U.S. application Ser. No. 12/603,136, filed on Oct. 21, 2009 now abandoned, which claims the benefit of U.S. Provisional Application No. 61/110,821 filed on Nov. 3, 2008. These prior applications are incorporated herein by reference.

BACKGROUND

Babies in general are quite delicate and prone to illness. Therefore, the babies are required to be handled with great care. In order to handle the babies carefully, a carrier or a portable bed may be used. Generally, a baby occupying such a carrier or a portable bed may get disturbed by a sunshine falling onto the baby's face. Further, when outdoors, the baby may face strong and cold winds which can make the baby ill. Furthermore, the baby occupying the carrier or the portable bed may get infected or diseased due to flies and other insects present around the baby.

The babies occupying the carrier or the portable bed are generally protected by clothing or blankets. However, when a caregiver covers a baby with a blanket or with clothing, the baby generally shows an abnormal behavior. This is because the blanket may limit ventilation and contact between the caregiver and the baby. A blanket spread over the baby carrier may also interfere with access to the baby carrier handle, or may interfere with the user's grip on the handle.

The baby may also be protected using conventional carriers that may contain a cover to protect the baby. However, the cover used in the conventional carriers may be ineffective for being used on a sunny day or on a cold day. Furthermore, the cover may be ineffective to shield the baby from extreme atmospheric conditions and from other outside elements such as insects.

SUMMARY OF THE INVENTION

In one aspect of the embodiments of the present invention, a protective cover is provided for covering a portion of a baby carrier in which a baby is to be received. The cover includes a canopy structured to enclose the baby-receiving portion of the carrier when secured to the baby carrier, and a first cutout portion formed along the canopy in a position enabling access to a handle of the baby carrier through the first cutout portion when the cover is positioned over the baby-receiving portion of the carrier. A handle cover flap is attached to the canopy and structured so as to be positionable to close the first cutout portion.

In another aspect of the embodiments of the present invention, a protective cover is provided for covering a portion of a baby carrier in which a baby is to be received. The cover includes a canopy structured to enclose the baby-receiving portion of the carrier when secured to the baby carrier, and at least one pocket positioned along a side of the canopy and spaced apart from a vertical plane bisecting the canopy when the baby carrier is sitting upright and the cover is positioned to cover the baby-receiving portion of the carrier.

In another aspect of the embodiments of the present invention, a cover flap attachable to a canopy of a cover for a baby carrier is provided. The canopy is structured to enclose a baby-receiving portion of the carrier when secured to the baby carrier. The canopy includes a first cutout portion formed along the canopy in a position enabling access to a handle of the baby carrier through the first cutout portion when the cover is positioned over the baby-receiving portion of the carrier. The cover flap is structured so as to be positionable, when attached to the canopy, to close the first cutout portion.

BRIEF DESCRIPTION OF THE DRAWINGS

These and other features and advantages of the present disclosure will be apparent from the following detailed description of preferred embodiments and best mode, appended claims, and accompanying drawings in which:

FIG. 2a is a front view of a baby carrier showing a handle cover flap in accordance with an embodiment of the present invention positioned to cover a handle of the baby carrier.

FIG. 5 is a perspective view of an alternative cover embodiment similar to the embodiment shown in FIGS. 1 and 2, and also incorporating a handle cover flap in accordance with an embodiment of the present invention in a disengaged or open configuration.

FIG. 6 is the embodiment shown in FIG. 5 showing the handle cover flap in a closed configuration.

FIGS. 7a and 7b are schematic side views of a cover embodiment similar to the embodiment shown in FIGS. 1 and 2, and showing a handle cover flap/pocket in accordance with an embodiment of the present invention.

FIGS. 8a and 8b are schematic side views of a cover embodiment similar to the embodiment shown in FIGS. 1 and 2, and showing a handle cover flap/pocket in accordance with another embodiment of the present invention.

FIG. 9 is a partial perspective view showing a handle cover flap/pocket in accordance with one embodiment of the present invention Like reference numerals refer to like parts throughout the description of the drawings.

DETAILED DESCRIPTION

The exemplary embodiments described herein in detail for illustrative purposes are subject to many variations in structure and design. It should be emphasized, however, that the present disclosure is not limited to a particular protective cover, as shown and described. It is understood that various omissions and substitutions of equivalents are contemplated as circumstances may suggest or render expedient, but these are intended to cover the application or embodiment without departing from the spirit or scope of the claims of the present disclosure. Also, it is to be understood that the phraseology and terminology used herein are for the purpose of description and should not be regarded as limiting.

The term "first," "second," "top," "bottom," and the like, herein do not denote any order, elevation or importance, but rather are used to distinguish placement of one element over another. Further, the terms, "a" and "an" herein do not denote a limitation of quantity, but rather denote the presence of at least one of the referenced item. Unless limited otherwise, the terms "attached," "connected," "coupled," and variations thereof herein are used broadly and encompass direct and indirect attachments, connections, and couplings.

The present disclosure provides a protective cover for a baby carrier. The protective cover is capable of protecting a baby occupying the baby carriers. The protective cover of the present disclosure will be explained in detail in conjunction with FIGS. 1 and 2.

Figure 1:
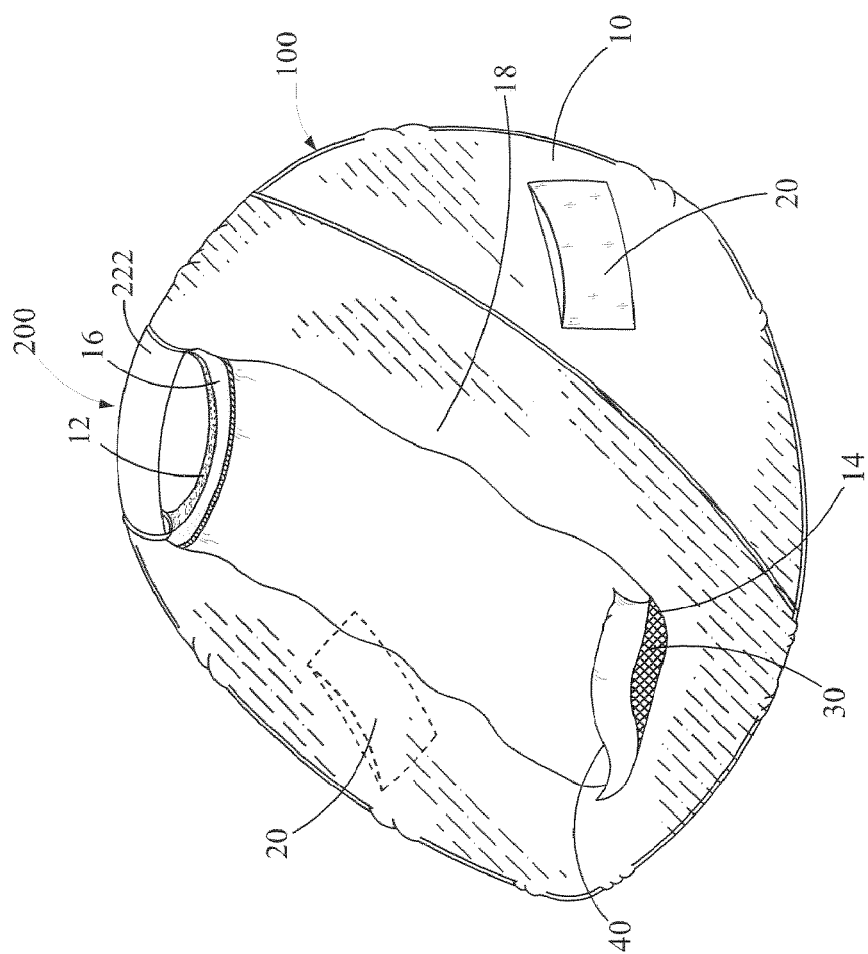
FIG. 1 is a perspective view of one embodiment of a protective cover mounted on a baby carrier.
Figure 2:
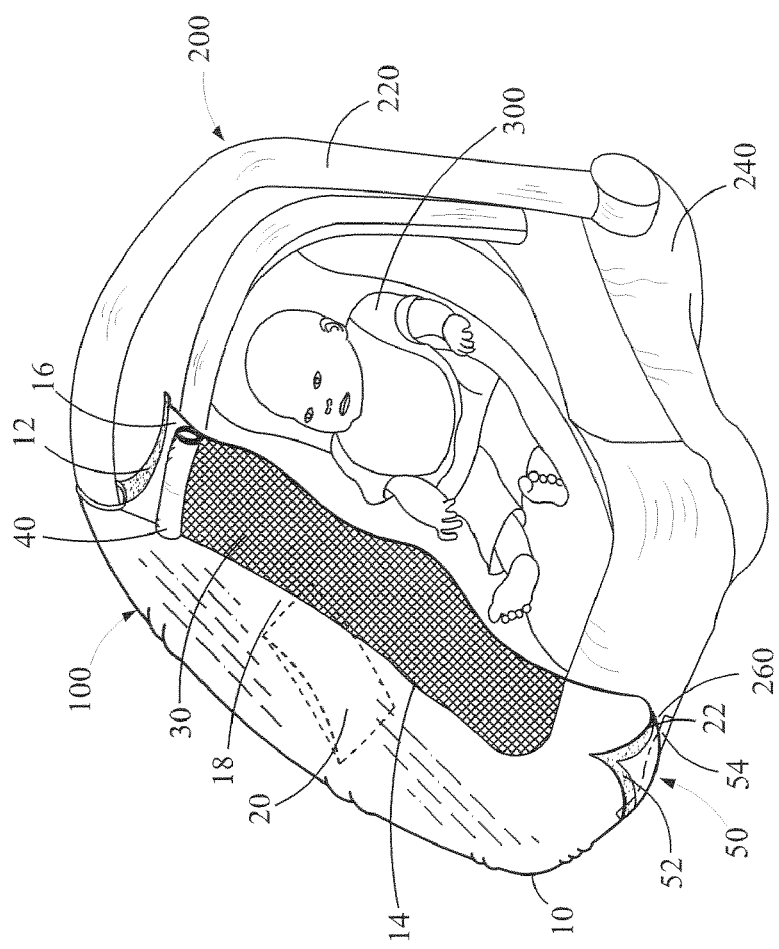
FIG. 2 illustrates a portion of the protective cover of FIG. 1 and a baby in the baby carrier.

Referring to FIGS. 1 and 2, one embodiment of a protective cover 100 mounted on a baby carrier 200 is shown. The baby carrier 200 to which the protective cover 100 may be attached includes a handle 220. The handle 220 is attached to a periphery 240 of the baby carrier 200, as shown in FIG. 2. Further, in the present embodiment, the protective cover 100 includes a canopy 10, a mesh 30, a flap 40, and an attaching mechanism 50, as shown in FIG. 2.

Embodiments of the canopy are configured to cover the entire top and sides of the baby carrier, and may be configured to cover the top portion of the handle (i.e., the portion gripped by a user to carry the baby carrier) as well. This allows the handle to remain in an upright position while the cover is in place. The cover may be formed from cotton, spandex, nylon, or any other suitable material or materials. In one form, the canopy 10 may be a piece of cloth that may be made of a flexible material. Further, the flexible material may be a waterproof or a water-repellant material. Alternatively, the canopy 10 may be made of any other suitable material. Further, the canopy 10 is configured to have a first cutout portion 12 and a second cutout portion 14. The second cutout portion 14 is configured adjacent to the first cutout portion 12. Specifically, the first cutout portion 12 is configured on a top portion 16 of the canopy 10 and the second cutout portion 14 is configured on a central portion 18 of the canopy 10. The first cutout portion 12 is configured in the form of an opening for accessing the handle 220 of the baby carrier 200. In a particular embodiment, an elastic material extends along the edge of the cutout portion 12. This tends to contract the opening size of cutout portion 12 when the handle is not being gripped by a user, to aid in minimizing the size of the opening. However, the size of the opening remains large enough for a user to comfortably reach through the opening and grip the handle without being constrained by the edge of the opening. Depending on the particular configuration of the baby carrier and how the cover wraps over the carrier, a portion of handle 220 may project out of first cutout portion 62 when the cover is applied to the baby carrier, or the handle may be recessed inside the cutout portion opening. However, in any embodiment described herein, the first cutout portion permits access to a portion of the handle that would be covered by the cover 100 if the first cutout portion was not present.

The canopy 10 may be further configured to have at least one pocket, such as pockets 20 for storing articles, such as a milk bottle or a diaper. The pockets 20 may be made of a textile material similar to the one used for making the canopy 10. Alternatively, the pockets 20 may be made of any other material. Further, the pockets 20 may be sewn to the canopy 10 as shown in FIGS. 1 and 2. Alternatively, one or more of the pockets 20 may be removably attached to the canopy.

In the embodiment shown in FIGS. 1, 2, and 2a pockets 20 are positioned along one or more sides of the canopy, spaced apart from a vertical plane P bisecting the canopy when the baby carrier is sitting upright on the ground or other surface, and the cover 100 is positioned to cover the baby-receiving portion of the carrier.

In a particular embodiment, the pockets 20 are positioned along a portion (or portions) of the canopy (such as along the canopy sides as shown in the drawings) that is not reachable or accessible to a baby strapped into the baby receiving portion of the carrier.

In a particular embodiment, the pockets 20 are positioned along a portion (or portions) of the canopy (such as along the canopy sides as shown in the drawings) that is not overlying a baby strapped into the baby receiving portion of the carrier.

The canopy 10 is capable of spanning around baby carriers of varying shapes and sizes due to its flexible nature. In the present embodiment, the canopy 10 is wrapped around the baby carrier 200 in a manner such that a portion 222 (as shown in FIG. 1) of the handle 220 protrudes out of the first cutout portion 12. The portion 222 of the handle 220 enables a caregiver to carry the baby carrier 200 with ease. Alternatively, the cover may be configured such that the handle is contained within the canopy when the cover is applied to the baby carrier. First cutout portion 12 then enables user access to the handle within the canopy.

The second cutout portion 14 of the canopy 10 enables the caregiver to monitor a baby 300 occupying the baby carrier 200 (as shown in FIG. 2). The second cutout portion 14 is covered with the mesh 30 in order to prevent the baby 300 from extreme atmospheric conditions and from other outside elements such as insects. The mesh 30 may be configured to assume similar dimensions as that of the second cutout portion 14 so as to entirely cover the second cutout portion 14. Specifically, the mesh 30 is disposed on the second cutout portion 14 and is sewn or otherwise suitably attached to the canopy 10 for shielding the baby 300 in the baby carrier 200. The mesh 30 may be made of a textile material and may have a lattice structure of a small mesh size. The textile material may be a waterproof or a water-repellant material. The mesh 30 enables the caregiver to monitor the baby 300 therefrom; and simultaneously protect the baby 300 from extreme atmospheric conditions and insects. Alternatively, the mesh 30 may be made of any other suitable material. In addition, the mesh openings may have any size or sizes suitable for the applications described herein. In addition, the mesh may be attached to the canopy so as to be permanently closed, or the mesh may be attached so as to be openable therealong to enable a user to move the mesh or disengage the mesh from the canopy to allow removal of the baby through the second cutout portion. For example, a zipper may be provided along a perimeter of the mesh to enable the edge of the mesh to be unzipped and detached from the canopy. Other methods of removable mesh attachment are also contemplated.

Further, the flap 40 is attached at the top portion 16 of the canopy 10 for removably covering the mesh 30. The flap 40 may be sewn at the top portion 16 of the canopy 10. Alternatively, the flap 40 may be attached in any other way at the top portion 16 of the canopy 10. The flap 40 may be made of same material as that of the canopy 10, and may have similar dimensions as that of the mesh 30. The flap 40 may be used to removably cover and uncover the mesh 30 upon need. For covering the mesh 30, the flap 40 may be untied and rolled down, as shown in FIG. 1. Further, for uncovering the mesh 30, the flap 40 may be rolled up and tied, as shown in FIG. 2.

Furthermore, the attaching mechanism 50 is configured for attaching the canopy 10 to baby carrier 200. The attaching mechanism 50 may be a hook and loop fastener. Specifically, the attaching mechanism 50 may include a first strap 52 having a plurality of hooks carried by a bottom peripheral portion 22 of the canopy 10, and a second strap 54 having a plurality of loops carried by a portion, such as a portion 260, of the baby carrier 200. The loops of the second strap 54 are configured to engage with the hooks of the first strap 52. The first strap 52 and the second strap 54 may be stitched or glued to the bottom peripheral portion 22 of the canopy 10 and the portion 260 of the baby carrier 200, respectively. Alternatively, any other attaching mechanism that is known in the art may be used for attaching the canopy 10 to the baby carrier 200. In another embodiment, the attaching mechanism 50 may be a band made of a material, such as an elastic material, sewn at the bottom peripheral portion 22 of the canopy 10 for securely attaching the canopy 10 to the baby carrier 200. The material may be a waterproof or a water repellant material. However, the band may be made of any other suitable material.

The protective cover 100 may be made as per a manufacturer's preference in order to fit a baby carrier that may have a size either larger or smaller than that of the baby carrier 200.

Figure 3:
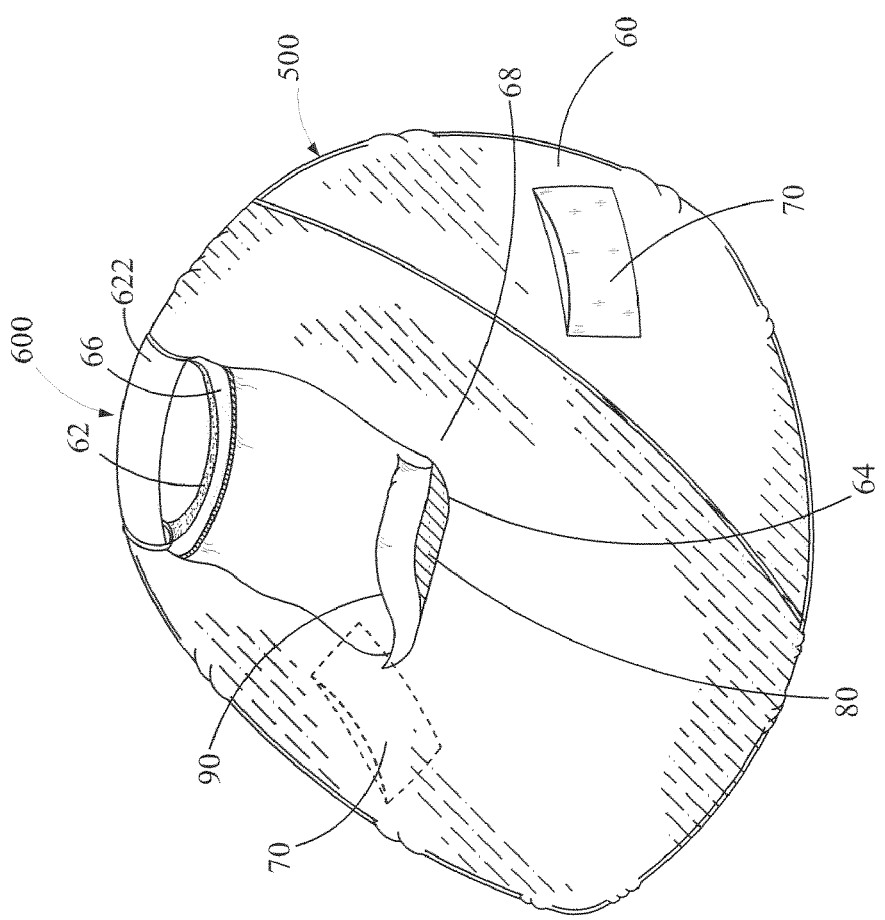
FIG. 3 is a perspective view of another embodiment of a protective cover mounted on a baby carrier.
Figure 4:
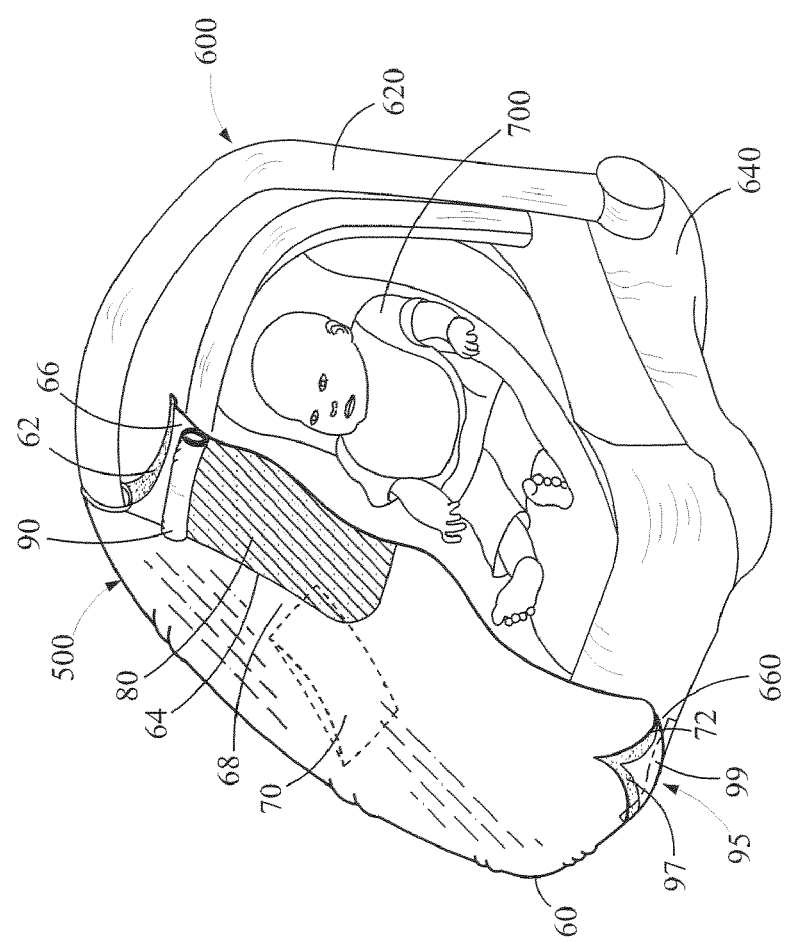
FIG. 4 illustrates a portion of the protective cover of FIG. 3 and a baby in the baby carrier.

As shown in FIGS. 3 and 4, another embodiment of a protective cover 500 of the present disclosure will be explained. The protective cover 500 is shown to be mounted on a baby carrier 600 for a baby 700. The baby carrier 600 may be similar to the baby carrier 200, and may include a handle 620 having a portion 622. The handle 620 is attached to a periphery 640 of the baby carrier 600, as shown in FIG. 4. Further, in the present embodiment, the protective cover 500 includes a canopy 60; at least one pocket, such as pockets 70; a mesh 80; a flap 90, and an attaching mechanism 95, as shown in FIG. 4.

The protective cover 500 may be similar to the protective cover 100. Specifically, the canopy 60 is similar to the canopy 10 of the protective cover 100, and is configured to have a first cutout portion 62 on a top portion 66 and a second cutout portion 64 on a central portion 68 thereof. Further, the pockets 70 are similar to the pockets 20 of the protective cover 100, and the flap 90 is similar to the flap 40 of the protective cover 100. Furthermore, the attaching mechanism 95 is similar to the attaching mechanism 50, and is configured for attaching the canopy 60 to the baby carrier 600. Specifically, the attaching mechanism 95 may include a first strap 97 having a plurality of hooks carried by a bottom peripheral portion 72 of the canopy 60, and a second strap 99 having a plurality of loops carried by a portion, such as a portion 660, of the baby carrier 600. The loops of the second strap 99 are configured to engage with the hooks of the first strap 97. The first strap 97 and the second strap 99 may be stitched or glued to the bottom peripheral portion 72 of the canopy 60 and the portion 660 of the baby carrier 600, respectively. However, the mesh 80 of the protective cover 500 may have a mesh size larger than that of the mesh 30 of the protective cover 100. Further, the mesh 80 may be made of any suitable material. Furthermore, the mesh 80 may have a length smaller than that of the mesh 30 of the protective cover 100, as shown in FIGS. 3 and 4.

The protective cover 500 may be made as per a manufacturer's preference in order to fit a baby carrier that may have a size either larger or smaller than that of the baby carrier 600.

FIGS. 5-6 show embodiments of the cover similar to that shown in FIGS. 1 and 2. Referring to FIGS. 5-6, any embodiment of the cover described herein may optionally include a combination handle cover flap/pocket 920 attached to the canopy 10 and configured for covering and overlapping the opening formed by first cutout portions 12, 62 when the handle 220 is not in use for transporting the carrier.

A first portion 920a of the handle cover flap/pocket 920 is attached to the canopy to secure the handle cover flap/pocket to the canopy. In one particular embodiment, the first portion 920a of the handle cover flap/pocket 920 is removably attached to the canopy using hook-and-loop fasteners or any other suitable method. In another particular embodiment, the first portion 920a of the handle cover flap/pocket 920 is permanently attached to the canopy 10 by stitching along an edge of the handle cover flap/pocket 920 or by any other suitable means.

A second portion 920b of the flap pivots about the secured first portion 920a of the flap and is positionable to cover and uncover the canopy opening formed by first cutout portions 12, 62. Hook-and-loop fasteners, snaps, or any other suitable attachment means may be positioned along the overlapping edges of first cutout portions 12, 62 and along the positionable portion of flap 920 to enable securement of the positionable portion of the flap to the canopy in the closed position (shown in FIGS. 7b and 8b) to cover and seal the opening formed by an associated one of first cutout portions 12, 62. This helps prevent rain, insects, and other external elements from entering the interior of the cover through first cutout portions 12, 62. FIG. 5 shows the handle flap/pocket 920 in a disengaged or open configuration, with first cutout portions 12, 62 exposed and handle 220 accessible to the user. FIG. 6 shows the handle flap/pocket 920 in a closed configuration. The flap 920 may be attached to the canopy along any portion of the flap and along any desired side of either of cutout first portions 12, 62, in any position enabling the pocket to be folded over to cover the associated first cutout portion.

Optionally, and as shown in the embodiments of FIGS. 7a-8b and 9, handle cover flap 920' incorporates a pocket defining an internal cavity 920c therein sized to receive the remainder of the cover therein when the cover is removed from the baby carrier and folded so as to fit inside the pocket. This combination handle cover flap/pocket 920' thus provides a convenient means for storing and transporting the cover when the cover is not in use. The handle cover flap/pocket 920' has a mouth 920m providing access into the cavity.

Referring to FIGS. 7a and 7b, in one particular embodiment, the handle flap/pocket 920' is attached to the canopy such that the opening provided by mouth 920m faces outwardly, in a direction away from the canopy when the handle flap/pocket 920' is in a closed condition. FIG. 7a shows the handle flap/pocket 920' in an open position, and FIG. 7b shows the handle flap/pocket 920' in a closed position, secured over the carrier handle.

Referring to FIGS. 8a and 8b, in another particular embodiment, the handle flap/pocket 920' is attached to the canopy such that the opening provided by mouth 920m faces toward the canopy when the handle flap/pocket 920' is in a closed condition. In this configuration, with the pocket mouth on the underside of the flap, and items may be stored in the handle flap/pocket 920' concealed from view. FIG. 8a shows the handle flap/pocket 920' in an open position, and FIG. 8b shows the handle flap/pocket 920' in a closed position, secured over the carrier handle.

In a particular embodiment, the handle flap/pocket 920' is structured to enable first portion 920a' to be attached to the canopy with the pocket mouth 920m in either the orientation shown in FIGS. 7a and 7b or the orientation shown in FIGS. 8a and 8b. Thus, the direction in which the pocket mouth faces (inwardly or outwardly) may be determined by user preference. This interchangeability can be achieved using, for example, application of suitable hook-and-loop fasteners to opposite sides of pocket first portion 920' and also to the surface of the canopy along which the pocket is to be attached.

Referring to FIGS. 7a-8b, in a particular embodiment, an optional pocket cover flap 950 is provided to wrap over or otherwise close pocket mouth 920m for sealing the handle flap/pocket 920'. This enables the handle flap/pocket 920' to be closed to contain the cover therein after insertion. Hook-and-loop fasteners or any other suitable means may be provided for securing the cover flap 950 in a closed condition. Alternatively, the pocket mouth may be closed and secured in a closed condition using any suitable method (for example, hook-and-loop fasteners or a zipper) without the use of cover flap 950.

In the manner described above, handle flap/pocket 920' may also provide additional available storage space for items other than the remainder of the cover. In addition, the handle flap/pocket 920' and its contents are kept spaced apart from a baby seated in the carrier by the carrier handle which resides in an upright position supporting the overhead portion of the canopy and the handle flap/pocket 920'.

In an embodiment incorporating a handle flap/pocket 920' as described above, one or more tie straps 940 may be attached to an exterior of the handle flap/pocket to enable the handle cover flap/pocket containing the folded canopy to be secured to the baby carrier or to any other desired object when the cover is not in use.

In an alternative embodiment (not shown), a handle cover flap 992 similar to cover flap 920 previously described, but without a pocket incorporated therein, is provided for covering and sealing the opening in the canopy formed by first cutout portions 12, 62 when the handle 220 is not in use for transporting the carrier. Cover flap 992 may be attached to the canopy so as to operate and secure to the canopy in the same manner as described for cover flap 920.

The present disclosure provides a protective cover, such as the protective cover 100 and the protective cover 500, for a baby carrier. The protective cover has a simple structural configuration and may be effectively used in varying atmospheric conditions. Specifically, a flap, such as the flaps 40 and 90, may be folded or unfolded to uncover or cover a mesh, such as the meshes 30 and 80, depending upon the atmospheric 10 conditions. Further, when the flap is folded, the caregiver is able to monitor the baby occupying the baby carrier from the mesh. Further, the protective carrier may provide proper ventilation and contact between the caregiver and the baby. The protective cover is also capable of protecting the baby from insects. Furthermore, the canopy of the protective cover includes a first cutout portion, such as the first cutout portions 12 and 62, 15 through which a portion of a handle of the baby carrier protrudes outwards (or through which the handle is accessible) when the protective cover is mounted over the baby carrier. Mounting the protective cover in such a manner facilitates the caregiver to carry the baby carrier by gripping the handle while covering the baby in the baby carrier.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A protective cover for covering a portion of a baby carrier in which a baby is to be received, the cover comprising:
   a canopy structured to enclose the baby-receiving portion of the carrier when secured to the baby carrier,
   a first cutout portion formed along the canopy in a position enabling a user to access to a handle of the baby carrier through the first cutout portion when the cover is positioned over the baby-receiving portion of the carrier; and
   a handle cover flap attached to the canopy and structured so as to be positionable to close the first cutout portion by folding the cover flap over the handle.

2. A protective cover for covering a portion of a baby carrier in which a baby is to be received, the cover comprising:
   a canopy structured to enclose the baby-receiving portion of the carrier when secured to the baby carrier,
   a first cutout portion formed along the canopy in a position enabling access to a handle of the baby carrier through the first cutout portion when the cover is positioned over the baby-receiving portion of the carrier; and
   a handle cover flap attached to the canopy and structured so as to be positionable to close the first cutout portion,
   wherein the handle cover flap includes:
   a pocket formed therein, the pocket defining a cavity sized to receive the remainder of the cover therein when the cover is folded; and
   a mouth providing access to the cavity.

3. The cover of claim 2 wherein the handle cover flap includes a first portion attached to the canopy, and a second portion positionable to cover the first cutout portion.

4. A protective cover for covering a portion of a baby carrier in which a baby is to be received, the cover comprising:
   a canopy structured to enclose the baby-receiving portion of the carrier when secured to the baby carrier,
   a first cutout portion formed along the canopy in a position enabling access to a handle of the baby carrier through the first cutout portion when the cover is positioned over the baby-receiving portion of the carrier; and
   a handle cover flap attached to the canopy and structured so as to be positionable to close the first cutout portion,
   wherein the handle cover flap is removably attached to the canopy.

5. The cover of claim 2 wherein the pocket mouth faces in a direction away from the canopy when the handle cover flap is in a position closing the first cutout portion.

6. The cover of claim 2 wherein the pocket mouth faces in a direction toward the canopy when the handle cover flap is in a position closing the first cutout portion.

7. The cover of claim 2 wherein the handle cover flap further comprises a pocket cover flap structured to wrap over the pocket mouth to close the pocket mouth.

8. The cover of claim 2 further comprising at least one tie strap coupled to the handle cover flap and structured to enable the handle cover flap to be attached another object.

9. The cover of claim 2 further comprising at least one pocket positioned along a portion of the canopy that is not reachable or accessible to a baby strapped into the baby receiving portion of the carrier.

10. A protective cover for covering a portion of a baby carrier in which a baby is to be received, the cover comprising:
    a canopy structured to enclose the baby-receiving portion of the carrier when secured to the baby carrier, and at least one pocket positioned along a side of the canopy and spaced apart from a vertical plane bisecting the canopy when the baby carrier is sitting upright and the cover is positioned to cover the baby-receiving portion of the carrier,
    wherein the carrier includes a handle usable for grasping the carrier, and wherein the cover further comprises a handle cover flap attached to the canopy and structured so as to be positionable to cover the handle so as to prevent grasping of the handle by the user.

11. A cover flap attachable to a canopy of a cover for a baby carrier, the canopy being structured to enclose a baby-receiving portion of the carrier when secured to the baby carrier, the canopy including a first cutout portion formed along the canopy in a position enabling access to a handle of the baby carrier through the first cutout portion when the cover is positioned over the baby-receiving portion of the carrier, the cover flap being structured so as to be positionable, when attached to the canopy, to close the first cutout portion, and to cover the handle so as to prevent grasping of the handle by the user.

12. The cover of claim 1 wherein the cover flap is structured so as to be positionable to close the first cutout portion by folding the cover flap over the handle so as to block access of the user to the handle.

\* \* \* \* \*

UNITED STATES PATENT AND TRADEMARK OFFICE
CERTIFICATE OF CORRECTION

| | |
|---|---|
| PATENT NO. | : 8,746,789 B2 |
| APPLICATION NO. | : 13/442820 |
| DATED | : June 10, 2014 |
| INVENTOR(S) | : Berry |

Page 1 of 1

It is certified that error appears in the above-identified patent and that said Letters Patent is hereby corrected as shown below:

In the Specification

Column 1; Line 18;   Delete the "a" before sunshine.

Signed and Sealed this
Twenty-third Day of September, 2014

Michelle K. Lee
*Deputy Director of the United States Patent and Trademark Office*